March 7, 1950 F. G. LIVINGSTON ET AL 2,499,658
FACING TOOL
Filed March 18, 1946 2 Sheets-Sheet 1
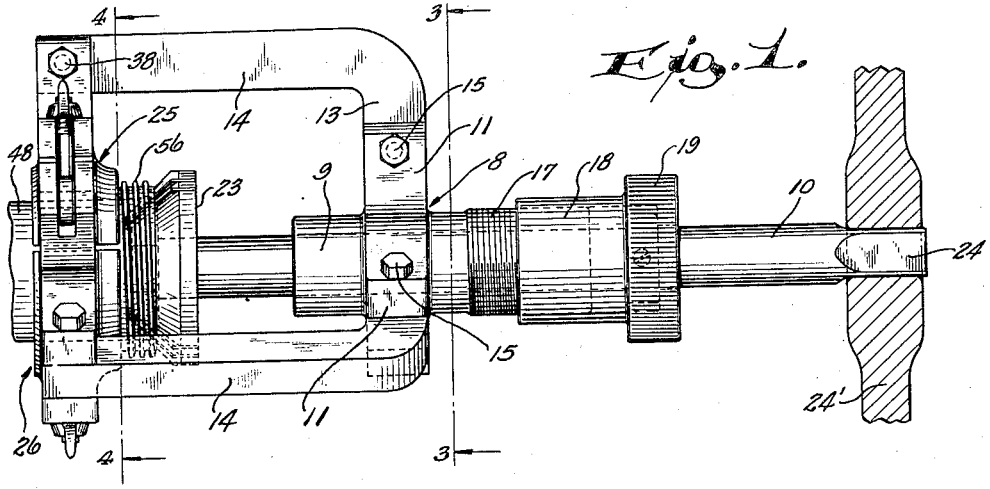
INVENTOR.
F. G. Livingston
BY C. L. Livingston
Morsell & Morsell
ATTORNEYS.

March 7, 1950     F. G. LIVINGSTON ET AL     2,499,658
FACING TOOL

Filed March 18, 1946     2 Sheets-Sheet 2

INVENTORS
F. G. Livingston
C. L. Livingston
BY Morsell & Morsell
ATTORNEYS.

Patented Mar. 7, 1950

2,499,658

UNITED STATES PATENT OFFICE 2,499,658

FACING TOOL

Francis G. Livingston and Charles L. Livingston,
Algona, Iowa

Application March 18, 1946, Serial No. 655,284

4 Claims. (Cl. 90—12.5)

This invention relates to improvements in facing tools.

In the repair or installation of metal conduits and fittings it is often necessary, while on the job, to perform a facing operating on the end of a tube or fitting in order to provide a seat for a cooperating part. When working in a food plant, such as a dairy, where sanitary fittings are used, it is very important that this work be done smoothly and accurately, and that the seat be properly centered with respect to the tube. When operating on elbows it is not possible to support the tool by engagement with the inside of the tube. Therefore, the facing tool of the present invention is a valuable supplement to the tool of our companion application Serial No. 655,283, filed March 18, 1946, and now Patent No. 2,453,848, granted November 16, 1948.

It is a general object of the present invention to provide a relatively small and readily portable facing tool which can be easily and quickly used on the job to perform a selected facing operation on the end of either a curved or straight tube or tubular fitting.

A further object of the invention is to provide a device of the class described which will perform its work accurately, with the cutter always maintained in a properly centered position with respect to the tube and wherein screw threads on a supporting portion of the tool may be engaged with screw threads on the end of the tube to aid in rigidly anchoring the facing tool in operative position.

A still further object of the invention is to provide a facing tool which is adapted for use in conjunction with rotary cutters of various types and sizes, including tapered cutters of the type having teeth positioned to cut an internal tapered seat or of the type having teeth positioned to cut an external tapered seat.

A further object of the invention is to provide a facing tool as above described including a pair of clamping members or adapters each having a semi-circular portion engageable with the outside of the tube near the end thereof, said adapters being formed either to grip the end of the tube having the externally threaded ferrule, or to grip the opposite end which has the shouldered ferrule.

A further object of the invention is to provide a facing tool as above described wherein the tube gripping adapters may be quickly reversed in position or interchanged with other adapters of different size.

Other objects of the invention are to provide a facing tool which is relatively inexpensive to manufacture, which has relatively few parts to get out of order, and which can be operated manually by an inexperienced workman.

With the above and other objects in view, the invention consists of the improved facing tool, and all its parts and combinations, as set forth in the claims, and all equivalents thereof.

In the accompanying drawing, illustrating one complete embodiment of the preferred form of the invention, in which the same reference numerals designate the same parts in all of the views:

Fig. 1 is a side elevational view of the improved tool showing its clamping members gripping the threaded end of a tube;

Fig. 2 is a similar view to Fig. 1, showing parts in longitudinal section;

Fig. 3 is a transverse sectional view taken on line 3—3 of Fig. 1;

Figure 4:
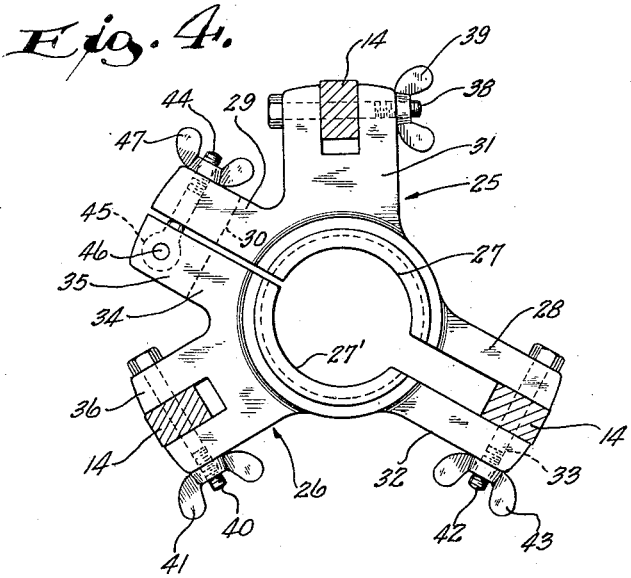
Fig. 4 is a transverse sectional view taken on line 4—4 of Fig. 1.

Referring more particularly to the drawing, the numeral 8 designates a spider having a central bearing portion 9 through which a stem 10 is journalled for rotation as well as axial movement. The spider has lateral projections 11, preferably three in number. Each projection is slotted as at 12 so as to form a fork for receiving the bent end portion 13 of an L-shaped clamping arm 14. A bolt 15 extends transversely through each fork and through the end of the clamping arm therein. Each clamping arm is pivotal on the bolt 15. A nut 16, threaded on each bolt, maintains the parts in assembled position.

The bearing portion of the spider has an outwardly projecting part 17 which is externally threaded to receive an internally threaded cylindrical feed member 18. The feed member has an enlarged knurled head 19 formed with an inwardly directed flange 20 which engages an adjustable collar 21 on the stem 10 to force the stem inwardly when the feed member 18 is turned down on the threading 17. The inner end of the stem is of reduced diameter and threaded as at 22 for threaded engagement with a selected cutter 23. The outer end of the stem is squared or otherwise formed as at 24 for cooperation with a turning handle 24'.

Two cooperating clamping members or adapters 25 and 26 are each formed with a semi-cylindrical recess, such as the recesses 27 and 27' (Fig. 4). These recesses cooperate, when the parts are in the position of Figs. 1 and 2, to embrace a tube therebetween.

The member 25 has a leg 28 projecting in one direction and an aligned leg 29 projecting in the opposite direction from the opposite side. The leg 29 is slotted intermediate its thickness as at 30. The leg 28 is formed with a transverse bolt hole. Intermediate the legs 28 and 29 is a forked leg 31.

The clamping member 26 is formed with a leg 32 which projects in the same direction as the leg 28 and which has a bolt hole 33. It is also formed with an oppositely projecting leg 34 which is slotted as at 35 and which projects adjacent to the leg 29 when the clamping members are in assembled relationship as in Fig. 4. In addition, there is a forked leg 36.

The swingable end of one of the clamping arms 14 fits in the slot of the forked leg 31 and is removably held in assembled position by a bolt 38 equipped with a wing nut 39. The swingable end of another one of the clamping arms 14 is received in the slot of the forked leg 36 and is removably held in position by a bolt 40 equipped with a wing nut 41. The swingable end of the other clamping arm 14 is positioned between the legs 28 and 32 and is removably held in position by a bolt 42 equipped with a wing nut 43. A bolt 44 having an eye 45 at one end and positioned in the slot of the leg 34 is pivotal on a pin 46 so that the free end of the bolt is swingable into and out of the slot 30 of the leg 29. A wing nut 47 may be manipulated to draw the legs 29 and 34 toward one another and create a clamping pressure around a pipe section 48 as in Figs. 1 and 2.

The recess 27 of the clamping member 25, which recess is nearly semi-cylindrical in cross-section, has a threaded portion 49 extending part way through the clamping member. For the remainder of the distance the recess is smooth and of decreased diameter as at 50 and there is a shoulder 51 between the portions 49 and 50. The recess 27' of the clamping member 26 is similarly formed with a threaded portion 52 and with a smooth portion of less diameter 53, there being a shoulder 54 therebetween.

In use of the tool, if it is desired to cut an internal tapered seat, such as the seat 55, of Fig. 2, in the end of a pipe fitting having an externally threaded ferrule 56, then the procedure illustrated in Figs. 1 and 2 is followed. The cutter 23 is screwed onto the threaded end of the stem 10 in the manner shown in Fig. 2. With the bolt 44 swung out of the slot 30 and with the bolt 42 on the opposite side removed, the two clamping members or adapters are swung toward each other to embrace the opposite sides of the tube 48. The tube is so positioned that the threaded adapter portions 49 and 52 will engage with threaded portions of the threaded ferrule 56. Then the bolt 42 is inserted, and the wing nut 43 is threaded on and tightened. Next, the bolt 44 is swung on its pivot to cause the swingable end to enter the slot 30 as in Fig. 4, and the wing nut 47 is tightened. Tightening of the wing nut 47 will cause a clamping pressure to be exerted on the tube so that the clamping members 25 and 26 are firmly anchored thereto. Due to the threaded engagement between the clamping member and the tube ferrule there is no possibility of axial movement of the clamping members along the tube.

The facing operation may now be performed by first rotating the head 19 of the feed member 18 until the rotary cutter 23 is in cutting engagement with the portion to be faced. The rotating handle 24' is then turned alternately with the feed member until the seat 55 has been completely cut. Due to the particular method of support for the cutter stem 10 it is obvious that the cutter will be firmly held in centered position.

Figure 5:
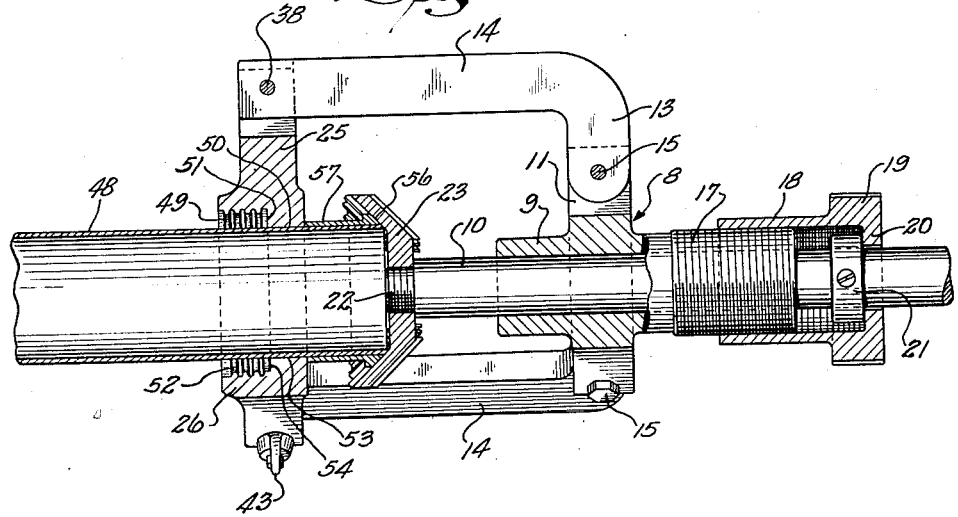
Fig. 5 is a view similar to Fig. 2 showing the cutter reversed in position to cut an external tapered seat.

If it is desired to cut an external tapered seat, such as the seat 56 of Fig. 5, on the opposite end of the tube 48, then the procedure illustrated in Fig. 5 is followed. Due to the fact that the ferrule 57 on this end of the tube has no threading, it is first necessary to reverse the position of the clamping members 25 and 26. This is done by removing the bolts 38, 40 and 42, and by turning the clamping members around before reassembly as in Fig. 5. This brings the reducer diameter portions 50 and 53 of the clamping member recesses 27 and 27' into engagement with the tube 48 beyond the ferrule, the clamping members abutting the inner end of the ferrule as in Fig. 5. The cutter 23 is then threaded onto the stem 10 in a reverse position from Fig. 2, so that the opposite sides of its teeth are in a position to cut the external tapered seat 56. Due to the abutment of the clamping members 25 and 26 with the end of the ferrule 57, the parts are held firmly during the facing operation.

When work is to be done on tubes of different diameters, different clamping members or adapters 25 and 26 may be quickly substituted and these adapters may be made in various ways to suit particular jobs.

Various changes and modifications may be made without departing from the spirit of the invention, and all of such changes are contemplated, as may come within the scope of the claims.

What we claim is:

1. A facing tool for operating on a tubular member having a threaded ferrule at one end comprising a stem, a supporting member in which said stem is journalled for rotation and for axial sliding movement, a cutter rigidly connected to said stem, arms pivoted to said supporting member, cooperating clamping members having arcuate recesses for embracing said tubular member detachably connected to said arms, said recesses having threading partway through the thickness of the clamping members for interlocking engagement with the threading on said ferrule and having smooth portions of less diameter adjacent said threaded recess portions for engagement with the tubular member inwardly of the ferrule, and means for releasably locking said clamping members in operative position.

2. A facing tool for operating on a tubular member comprising a stem, a supporting member in which said stem is journalled for rotation and for axial sliding movement, a cutter rigidly connected to said stem, three similar arms pivoted at equally spaced points 120° apart to said supporting member, a pair of cooperating clamping members having arcuate recesses for embracing said tubular member and each having oppositely disposed legs and a forked extension therebetween, means for connecting the inner end of one of said arms to the forked extension of one of said clamping members, means for connecting the inner end of another of said arms to the forked extension of the other clamping member, means for connecting the other arm between adjacent legs of the two clamping members, and means for releasably and clampingly connecting the other two adjacent legs of said clamping members.

3. A facing tool for operating on a tubular member comprising a stem, a supporting member in which said stem is journalled for rotation and for axial sliding movement, a cutter rigidly connected to said stem, three similar arms pivoted at equally spaced points 120° apart to said supporting member, a pair of cooperating clamping members having arcuate recesses for embracing said tubular member and each having oppositely disposed legs and a forked extension therebetween, means for removably connecting the inner end of one of said arms to the forked extension of one of said clamping members, means for removably connecting the inner end of another of said arms to the forked extension of the other clamping member, means for removably connecting the other arm between adjacent legs of the two clamping members, and means for releasably and clampingly connecting the other two adjacent legs of said clamping members.

4. A facing tool for operating on a tubular member comprising a stem, a supporting member in which said stem is journalled for rotation and for axial sliding movement, a cutter rigidly connected to said stem, at least three similar arms pivoted to said supporting member, a pair of cooperating clamping members having arcuate recesses for embracing said tubular member and each having oppositely disposed legs and a forked extension therebetween, means for connecting the inner end of one of said arms to the forked extension of one of said clamping members, means for connecting the inner end of another of said arms to the forked extension of the other clamping member, means for connecting the other arm between adjacent legs of the two clamping members, and means for releasably and clampingly connecting the other two adjacent legs of said clamping members.

FRANCIS G. LIVINGSTON.
CHARLES L. LIVINGSTON.

REFERENCES CITED

The following references are of record in the file of this patent:

UNITED STATES PATENTS

| Number | Name | Date |
|---|---|---|
| 378,196 | Dunn | Feb. 21, 1888 |
| 466,728 | Smith | Jan. 5, 1892 |
| 1,414,480 | Midgley | May 2, 1922 |
| 1,534,908 | Browder | Apr. 21, 1925 |
| 1,905,819 | Doyle | Apr. 25, 1933 |
| 2,211,183 | Tytus et al. | Aug. 13, 1940 |
| 2,416,228 | Sheppard | Feb. 18, 1947 |

FOREIGN PATENTS

| Number | Country | Date |
|---|---|---|
| 549,906 | Germany | May 4, 1932 |